(12) United States Patent
Wahl et al.

(10) Patent No.: US 7,736,071 B2
(45) Date of Patent: Jun. 15, 2010

(54) DIGITAL CAMERA PEDESTAL WITH CABLE IN NECK

(75) Inventors: Eric Joseph Wahl, Kirkland, WA (US); Donald Charles Grome, Edmonds, WA (US); Michael Baseflug, Duvall, WA (US)

(73) Assignee: Microsoft Corporation, Redmond, WA (US)

( * ) Notice: Subject to any disclaimer, the term of this patent is extended or adjusted under 35 U.S.C. 154(b) by 894 days.

(21) Appl. No.: 11/476,961

(22) Filed: Jun. 27, 2006

(65) Prior Publication Data

US 2007/0297788 A1   Dec. 27, 2007

(51) Int. Cl.
G03B 17/00 (2006.01)
H04N 5/225 (2006.01)

(52) U.S. Cl. .................. 396/419; 396/428; 348/373; 348/376

(58) Field of Classification Search ................. 396/419, 396/428; 348/373
See application file for complete search history.

(56) References Cited

U.S. PATENT DOCUMENTS

| | | | | |
|---|---|---|---|---|
| 4,673,268 A * | 6/1987 | Wheeler et al. | ............. | 352/243 |
| 4,963,903 A * | 10/1990 | Cane | ........................... | 396/428 |
| 5,649,256 A * | 7/1997 | Wen | ............................ | 396/427 |
| 6,572,282 B1 * | 6/2003 | Okuley et al. | ............... | 396/428 |
| 6,679,463 B1 * | 1/2004 | Chen | ........................... | 248/126 |
| D500,067 S * | 12/2004 | Liu | ........................... | D16/202 |
| 6,845,954 B1 * | 1/2005 | Moayer et al. | ........... | 248/187.1 |
| 6,947,093 B2 * | 9/2005 | Yanakawa et al. | ........... | 348/373 |
| D515,613 S | 2/2006 | Holmes | ..................... | D16/242 |
| 7,038,709 B1 * | 5/2006 | Verghese | ..................... | 348/169 |
| 7,066,664 B1 * | 6/2006 | Sitoh et al. | .................. | 396/428 |
| 7,126,816 B2 * | 10/2006 | Krah | ........................... | 361/683 |
| 7,435,019 B2 * | 10/2008 | Lee | ............................ | 396/427 |
| 7,465,108 B2 * | 12/2008 | Brown | ........................ | 396/427 |
| 2002/0001469 A1 * | 1/2002 | Prather et al. | ............... | 396/419 |
| 2006/0104633 A1 * | 5/2006 | Kenoyer et al. | ............. | 396/428 |
| 2006/0109375 A1 * | 5/2006 | Ho et al. | ...................... | 348/376 |
| 2007/0036539 A1 * | 2/2007 | Martinez et al. | ............ | 396/419 |
| 2008/0068493 A1 * | 3/2008 | Hida et al. | .................. | 348/373 |

* cited by examiner

Primary Examiner—Melissa J Koval
(74) Attorney, Agent, or Firm—Woodcock Washburn LLP

(57) ABSTRACT

A digital camera pedestal with cable in neck is provided which may comprise a base member, a neck, and a camera housing. The base member can comprise a surface mount, a cable exit annulus, and a neck mount. The surface mount and said neck mount can attach together forming an interior cavity. A cable enters the cavity through the neck mount, and exits through the cable exit annulus. An annular neck member is rotatably attached to the neck mount, such that it can rotate in a vertical plane, and a camera housing member is in turn rotatably attached to the neck member, where the housing member can rotate in a horizontal plane.

14 Claims, 4 Drawing Sheets

DIGITAL CAMERA PEDESTAL WITH CABLE IN NECK

BACKGROUND

Small, surface mounted or clip mounted digital cameras, commonly referred to as "webcams" have proliferated as applications such as digital picture sharing, video file sharing, video conferencing, security monitoring and the like continue to expand. "Webcam" refers to digital cameras that are used for a host of purposes beyond uploading images or video to the internet, as the name implies.

One interesting new market for webcams is the video gaming market, where webcams will be used for a wide variety of functions, such as capturing a player's picture for upload to a gamer identification database, video conferencing, inserting custom pictures and videos into games, video feedback so games can react to player physical motion, and the like.

One problem facing any webcam design is making a webcam of sufficiently small size, so that it does not consume too much desktop or set-top real estate. While small size is desirable, so is camera stability. Users do not want webcams that are constantly falling over backward because a heavy cable extends from the back of the webcam. Size and stability are often inversely related, such that small size yields less stability. Another problem in webcam design is to allow the camera to aim at a desired angle and hold position. The angle at which a webcam is aimed should preferably be adjustable in both the vertical and horizontal planes.

A variety of solutions to the size and stability problem can be seen in today's market for webcams. Clipable webcams are available that can be clipped to a computer display. Webcams may also be made with a somewhat large flat-surfaced base member that supports an elevated digital camera. In this configuration, a cable extends out from directly behind the camera and tends to pull the camera backward. The base member must be sufficiently large to prevent the camera from falling over, which of course negatively impacts pedestal size requirements.

In light of the size and stability tradeoff, as well as a host of other potential advantages and improvements that can be obtained, the industry and the consuming public is in need of a better digital camera pedestal.

SUMMARY

In consideration of the above-identified shortcomings of the art, the present invention provides a digital camera pedestal comprising a base member, a neck, and a camera housing. The base member can comprise a surface mount, for example a flat surface that sits on a desk or shelf, a cable exit annulus, and a neck mount. The surface mount and said neck mount can attach together forming an interior cavity. A cable enters the cavity through the neck mount, as will be described, and exits through the cable exit annulus. An annular neck member is rotatably attached to the neck mount, such that it can rotate in a vertical plane, and a camera housing member is in turn rotatably attached to the neck member, where the housing member can rotate in a horizontal plane. The camera housing member can comprise a camera exit annulus, and the cable passes from the electronics associated with a camera that protrudes through the camera exit annulus, through the annular neck member, and into the interior cavity of the base member. Other advantages and features of the invention are described below.

BRIEF DESCRIPTION OF THE DRAWINGS

The systems and methods for digital camera pedestal with cable in neck in accordance with the present invention are further described with reference to the accompanying drawings in which.

DETAILED DESCRIPTION

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention.

Figure 1:
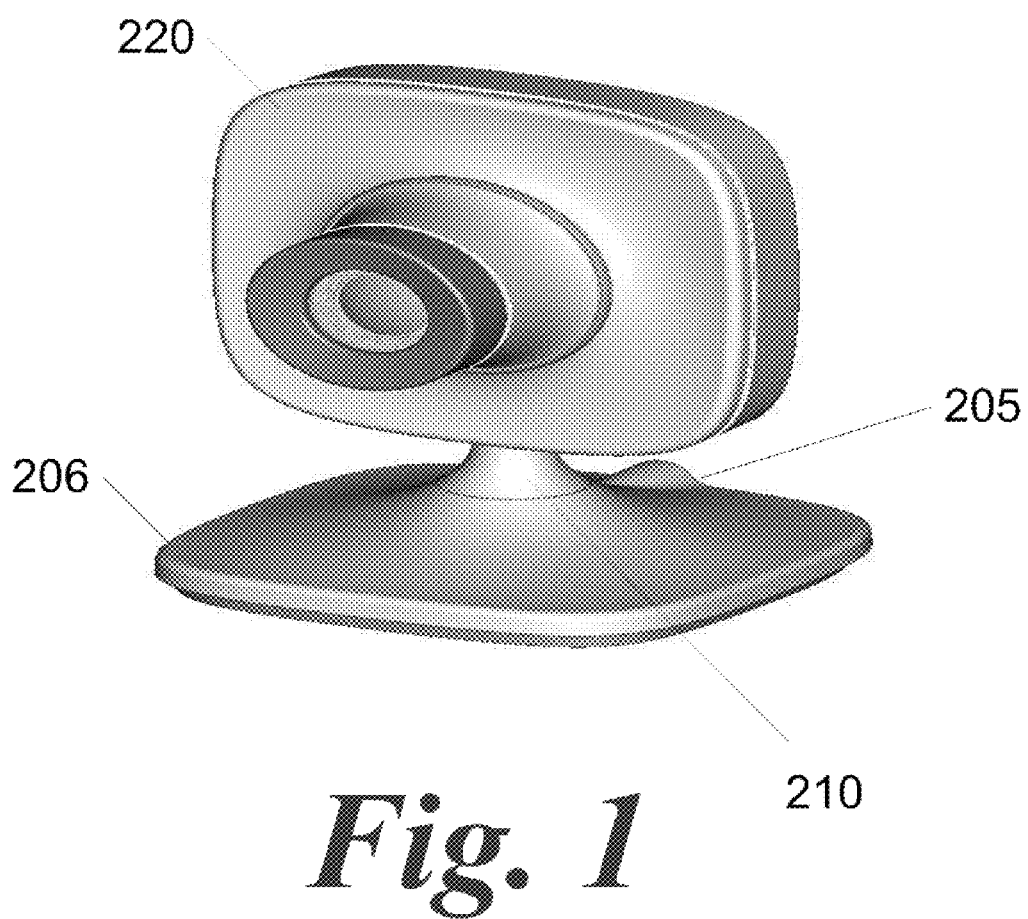
FIG. 1 illustrates one illustrative embodiment of an exemplary digital camera pedestal with cable in neck.

The digital camera pedestal with cable in neck generally overcomes various problems in webcam design by providing configuration as illustrated in FIG. 1. The entirety of the object represented in FIG. 1 is referred to as a digital camera pedestal. The illustrated digital camera pedestal generally comprises a base member 206, an annular neck member 210, and a camera housing member 220. A cable which is not visible in FIG. 1 runs from a camera located inside camera housing member 220, through the annular neck member 210, into an interior cavity in the base member 206, and out of a cable exit annulus 205.

Figure 2:
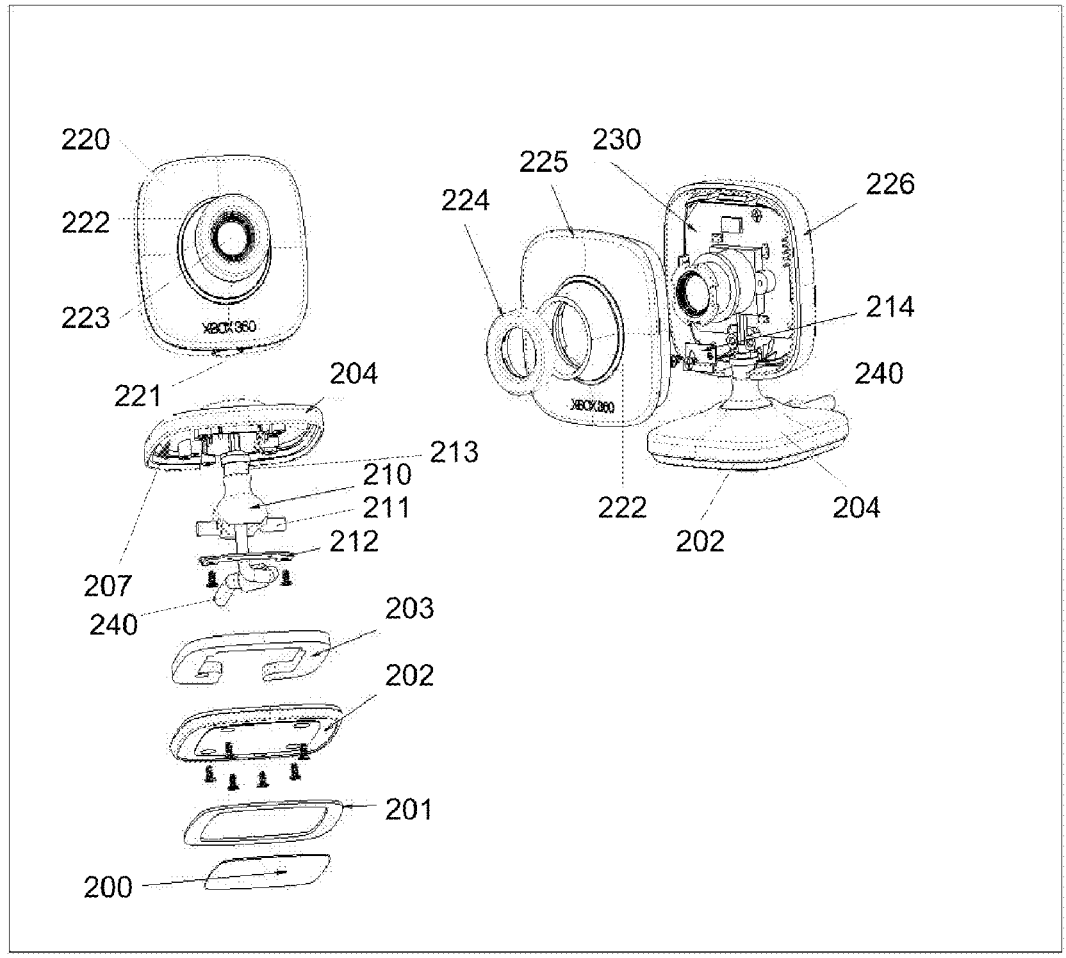
FIG. 2 is an exploded view of the various components of an exemplary digital camera pedestal with cable in neck.
Figure 4:
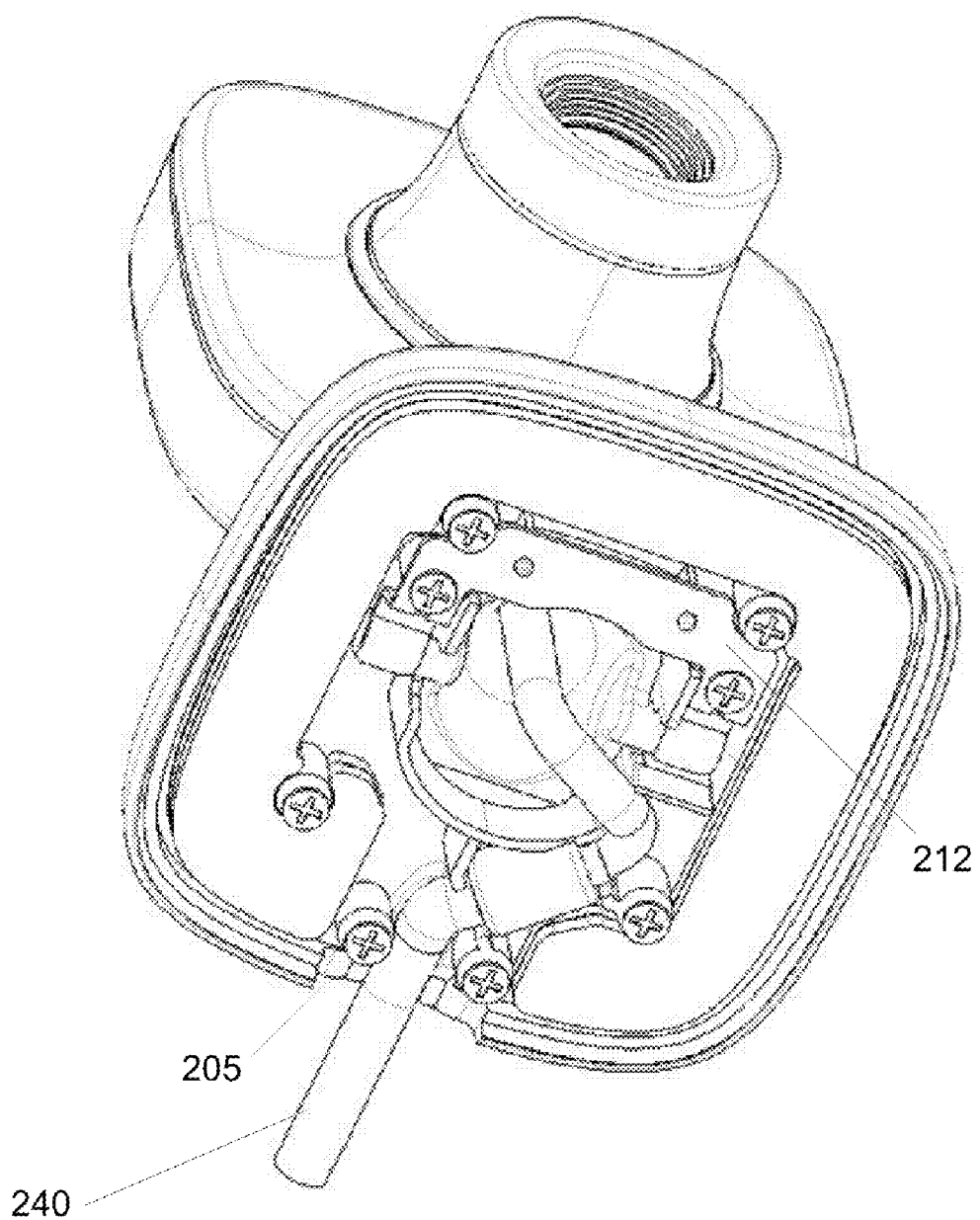
FIG. 4 illustrates a view of the underside of the exemplary digital camera pedestal with cable in neck, in which the surface mount is removed from the base member to reveal the interior cavity of the base member.

FIG. 2 is an exploded view of the various components of an exemplary digital camera pedestal. In FIG. 2, the base member generally comprises components 200-205. Component 205, the cable exit annulus, is not readily visible in FIG. 2. Refer to FIG. 4 for a clear view of this component. The main components of the base member are the surface mount 202 and the neck mount 204. When coupled together, these components form an interior cavity 207. The surface mount 202 may comprise a substantially flat, sturdy material that is designed to rest on a flat surface. Surface mount 202 may comprise components such as screw cover 200, stabilizing ballast 203, and traction pad 201. Traction pad 201 and screw cover 202 may stick to the surface mount 202 by means of a glue or adhesive material. Although not limited to any particular size, surface mount 202 may advantageously be between 1 and 5 square inches in size to meet the desired size requirements of most consumers and to take advantage of the increased stability of the pedestal design illustrated herein. Surface mount 202 may be coupled to neck mount 204, for example by means of plastic or metal snap-in fastening system.

Neck mount 204 may attach to surface mount 202 and also to the neck member 210. As such, neck mount 204 may comprise an annulus through which the neck member 210 passes. The underside of the neck mount 204 may comprise appropriately configured fastening interfaces, for example threaded screw holes, for holding the neck member 210 in place. It is contemplated that the neck member 210 is rotatably attached to the neck mount 204, so neck mount 204 may be configured to support appropriate hardware connecting apparatus.

The base member may also comprise a cable exit annulus 205, which is not clearly illustrated in FIG. 2, but can be clearly viewed in FIG. 4. Cable exit annulus 205 allows the cable 240 to pass out of the base member and on to the cable connection interface, for example to the Universal Serial Bus (USB) interface on a personal computer or game console. It should be noted that the terms "annulus" and "annular" as used herein should be understood as referring to a substantially annular design, which does not foreclose shapes that are not perfectly round but nonetheless serve a similar function for the element in question. For example, a cable exit annulus 205 could be easily made in any shape, such as a square, star, oval or octagon, and such shapes should be considered to be well within the spirit of the invention.

Annular neck member 210 can, in one embodiment, be a cylindrical hard plastic component through which a cable passes on its way from the camera housing member 220 to the base member. Neck member 210 is rotatably attached to the neck mount 204. In the illustrated embodiment, neck member 210 is attached via horizontal rotation axis friction member 212 which is held to the neck member 210 using the friction member 212 attached to said neck mount 204 and in contact with said annular neck member 210 such that a force of friction opposes rotation of said annular neck member 210. When configured as illustrated, the neck member 210 is rotatable in a vertical plane. Friction member may be, for example a metal bracket that is shaped in such a way as to deform when held down onto the rotation axis 211, thereby allowing the neck member 210 to rotate on the axis 211, but to hold its position due to the force of friction unless an appropriately substantial force is applied to overcome such friction.

In one embodiment, annular neck member 210 thus comprises a proximal end and a distal end, where said proximal end is rotatably attachable to a base member, e.g. the neck mount 204 portion of the illustrated base member, and said distal end is rotatably attachable to a camera housing member 220 such that said camera housing member 220 is rotatable in at least two planes. Cable 240 passes from said camera housing member 220 through said annular neck member 210 and into said base member.

To prevent cable pinching or otherwise exceeding the capacity of the cable or other aspects of the pedestal, the neck mount 204 may be shaped in such a way as to limit rotational freedom of said annular neck member 210 to some predetermined range of motion. This is accomplished by the neck member 210 making contact with the neck mount 204 when the neck member is tilted sufficiently far forward or sufficiently far backward. In a current implementation, the neck member 210 has approximately 90 degrees of motion: starting from a straight up position (0 degrees) it can tilt approximately 45 degrees forward, and approximately 45 degrees backward. However, it will be appreciated that differing amounts of rotational motion can be accomplished using other design and shape configurations. For example, anywhere from 40 to 140 degrees of motion could be feasible and useful for the consumer.

A camera housing member 220 may be rotatably attached atop said annular neck member 210. Cable 240 may pass through the neck member 210 and into the camera housing member 220 through a cable exit annulus 221 in the camera housing member 220. The camera housing member 220 may rotate on a vertical axis portion 213 of said neck member 210. When configured as illustrated, the camera housing is rotatable in the horizontal plane. A friction member 214 may be attached to said camera housing member 220 and in contact with said annular neck member 210 such that a force of friction opposes rotation of said camera housing member 210. While the hardware may be somewhat different due to different space and dimensional constraints, the operation of friction member 214 may be similar to that of friction member 212.

To prevent cable pinching or otherwise exceeding the capacity of the cable or other aspects of the pedestal, the annular neck member 210 may comprise two rotational motion stops that limit rotational freedom of said camera housing member 220 to a predetermined range of motion. In a current implementation, the camera housing member 220 has approximately 90 degrees of motion: starting from a straight forward position (0 degrees) it can twist approximately 45 degrees to the right, and approximately 45 degrees to the left. However, it will be appreciated that differing amounts of rotational motion can be accomplished using other design and shape configurations. For example, anywhere from 40 to 140 degrees of motion could be feasible and useful for the consumer.

The camera housing 220 may comprise a front plate 225 and a back plate 226 which attach together, forming an interior cavity in which the digital camera electronics 230 may reside. Digital camera 230 may receive light through a camera exit annulus 223 located in the front plate 225. A lens may be situated in camera exit annulus 223 and a rotatable focus ring 224 may be provided for advancing and retracting the lens to obtain a desired level of magnification or camera focus.

Digital camera 230 may be a single frame camera or a video camera as appropriate. It may be of a wide variety of differing qualities and resolutions as desired by the manufacturer and according to a desired price point for the pedestal. Cable 240 may be electrically coupled to digital camera 230 in the camera housing 220.

The camera housing 220 may further comprise an annulus of translucent material 222 concentric with said camera exit annulus 223. A plurality of lights (232, 234, 236) within said camera housing member 220, such as low-power Light Emitting Diode (LED) lights, (232, 234, 236), may illuminate when the cable 240 is attached to an electrical power source. The lights may illuminate the annulus of translucent material 222, thereby indicating to a user that the camera 230 is plugged in and operational.

Figure 3:
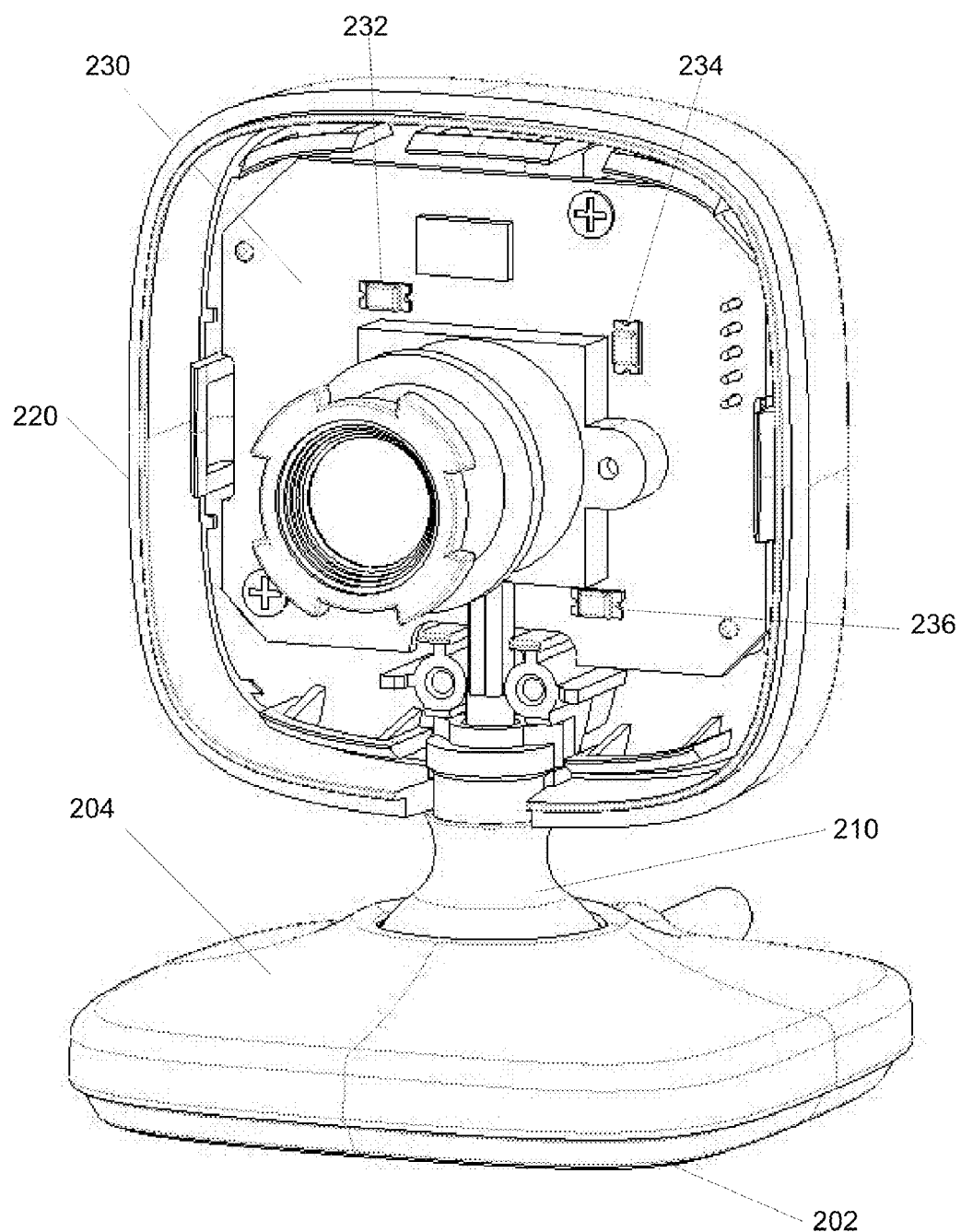
FIG. 3 illustrates a view of the exemplary digital camera pedestal with cable in neck in which a front plate is removed from the camera housing to reveal the interior of the camera housing.

FIG. 3 illustrates a view of the exemplary digital camera pedestal with cable in neck in which a front plate is removed from the camera housing to reveal the interior of the camera housing. FIG. 3 also further illustrates how the neck member 210 may be rotated in a vertical plane—i.e. tilted forward and backward, with respect to the neck mount 204, while surface mount 202 sits firmly on a flat surface. Meanwhile, housing member 220 in which digital camera 230 is located, may be rotated in a horizontal plane, i.e. twisted right and left, with respect to the neck member 210.

FIG. 4 illustrates a view of the underside of the exemplary digital camera pedestal with cable in neck, in which the surface mount is removed from the base member to reveal the interior cavity of the base member. A bracket used as a friction member 212 is attached to the underside of neck mount 204. The cable 240 can be seen coming down through the neck member and into an interior cavity in the base member, then out of the exit annulus 205. Also, a molded set of features in the base member provides cable strain relief by preventing the cable 240 from being pulled out by a user.

In addition to the specific implementations explicitly set forth herein, other aspects and implementations will be apparent to those skilled in the art from consideration of the specification disclosed herein. It is intended that the specification and illustrated implementations be considered as examples only, with a true scope and spirit of the following claims.

The invention claimed is:

1. A digital camera pedestal, comprising:
   a base member comprising a surface mount, a cable exit annulus, and a neck mount, said surface mount and said neck mount forming an interior cavity;
   a annular neck member that is rotatably attached to said neck mount;
   a friction member attached to said neck mount and in contact with said annular neck member such that a force of friction opposes rotation of said annular neck member;
   a camera housing member comprising a camera exit annulus, wherein said camera housing member is rotatably attached to said annular neck member; and
   a cable electrically coupled to a digital camera located in said camera housing member that passes from said camera housing member through said annular neck member and into said interior cavity in the base member, said cable exiting said base member from said cable exit annulus.

2. The digital camera pedestal of claim 1, further comprising a friction member attached to said camera housing member and in contact with said annular neck member such that a force of friction opposes rotation of said camera housing member.

3. The digital camera pedestal of claim 1, said a annular neck member comprising two rotational motion stops that limit rotational freedom of said camera housing member to approximately 40 to 140 degrees of motion.

4. The digital camera pedestal of claim 1, wherein said camera housing member further comprises an annulus of translucent material concentric with said camera exit annulus.

5. The digital camera pedestal of claim 4, further comprising a plurality of lights within said camera housing member, said lights illuminating said annulus of translucent material.

6. The digital camera pedestal of claim 1, wherein said annular neck member is rotatably attached to said neck mount such that the annular neck member is rotatable in a vertical plane.

7. The digital camera pedestal of claim 1, wherein said camera housing member is rotatably attached to said annular neck member such that the camera housing member is rotatable in a horizontal plane.

8. The digital camera pedestal of claim 1, wherein said neck mount limits rotational freedom of said annular neck member to approximately 40 to 140 degrees of motion.

9. The digital camera pedestal of claim 1, wherein said digital camera is a digital video camera.

10. The digital camera pedestal of claim 1, wherein said cable is a Universal Serial Bus (USB) cable.

11. The digital camera pedestal of claim 1, wherein said surface mount comprises a substantially flat surface attachable to said neck mount.

12. A digital camera pedestal, comprising:
    an annular neck member comprising a proximal end and a distal end, where said proximal end is rotatably attachable to a base member and said distal end is rotatably attachable to a camera housing member such that said camera housing member is rotatable in at least two planes, and where said camera housing member further comprises an annulus of translucent material concentric with a camera exit annulus; and
    a cable electrically coupled to a digital camera located in said camera housing member that passes from said camera housing member through said annular neck member and into an interior cavity in said base member.

13. The digital camera pedestal of claim 12, further comprising said base member, wherein said base member comprises a surface mount, a cable exit annulus, and a neck mount.

14. A digital camera pedestal, comprising:
    a base member comprising a surface mount, a cable exit annulus, and an annular neck mount, said surface mount and said annular neck mount forming an interior cavity, where said surface mount comprises a substantially flat surface, and where said substantially flat surface is between 1 and 5 square inches in size;
    a cable electrically coupled to a digital camera located in a camera housing member entering said interior cavity in said base member via said annular neck mount, and exiting said interior cavity via said cable exit annulus.

* * * * *